C. F. MURRAY.
PULLEY.
APPLICATION FILED APR. 10, 1908

899,754.

Patented Sept. 29, 1908.
2 SHEETS—SHEET 1.

C. F. MURRAY.
PULLEY.
APPLICATION FILED APR. 10, 1908
899,754.
Patented Sept. 29, 1908.
2 SHEETS—SHEET 2.
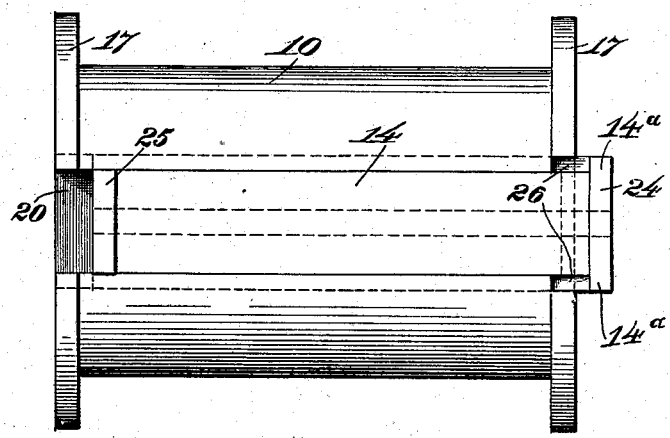
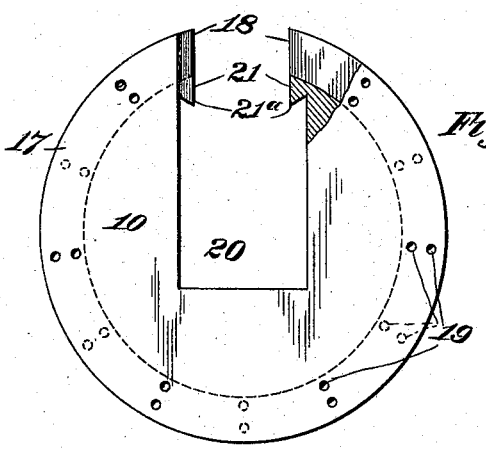
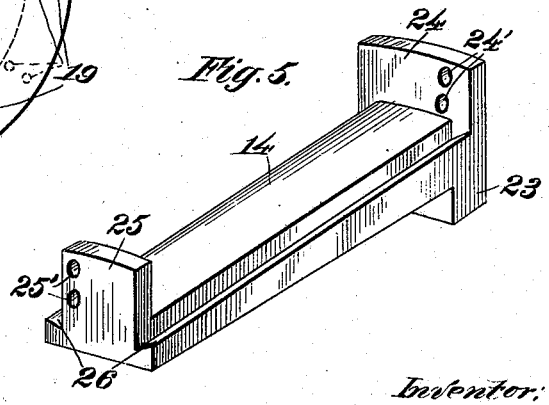

UNITED STATES PATENT OFFICE.

CHARLES F. MURRAY, OF CHICAGO, ILLINOIS, ASSIGNOR TO C. W. KELLEY AND C. N. KELLEY, OF MADISON, WISCONSIN.

PULLEY.

No. 899,754.　　　　Specification of Letters Patent.　　　　Patented Sept. 29, 1908.

Application filed April 10, 1908. Serial No. 426,206.

*To all whom it may concern:*

Be it known that I, CHARLES F. MURRAY, a citizen of the United States, residing at Chicago, Cook county, Illinois, have invented certain new and useful Improvements in Pulleys, of which the following is a specification.

My invention relates to pulleys, and has particular reference to pulleys of the variety which by the removal of a segment of the rim, may be applied to the shaft without dismantling the shafting arrangement. I do not claim it new to construct a pulley according to this general characterization. On the contrary, very many similar devices have been patented within the past twenty years, but a careful search has failed to disclose in the prior art, patents which are essentially practical, or which by use of the elements therein set forth, could be made practical for general use.

The device which will be described and claimed hereinafter is eminently practical, requires no machine work to make it operative, and is very inexpensive in its construction.

With the objects in view, therefore, of securing a practical, simple and inexpensive construction, the invention consists in the parts and details as hereinafter described and particularly pointed out in the claim.

Figure 1:
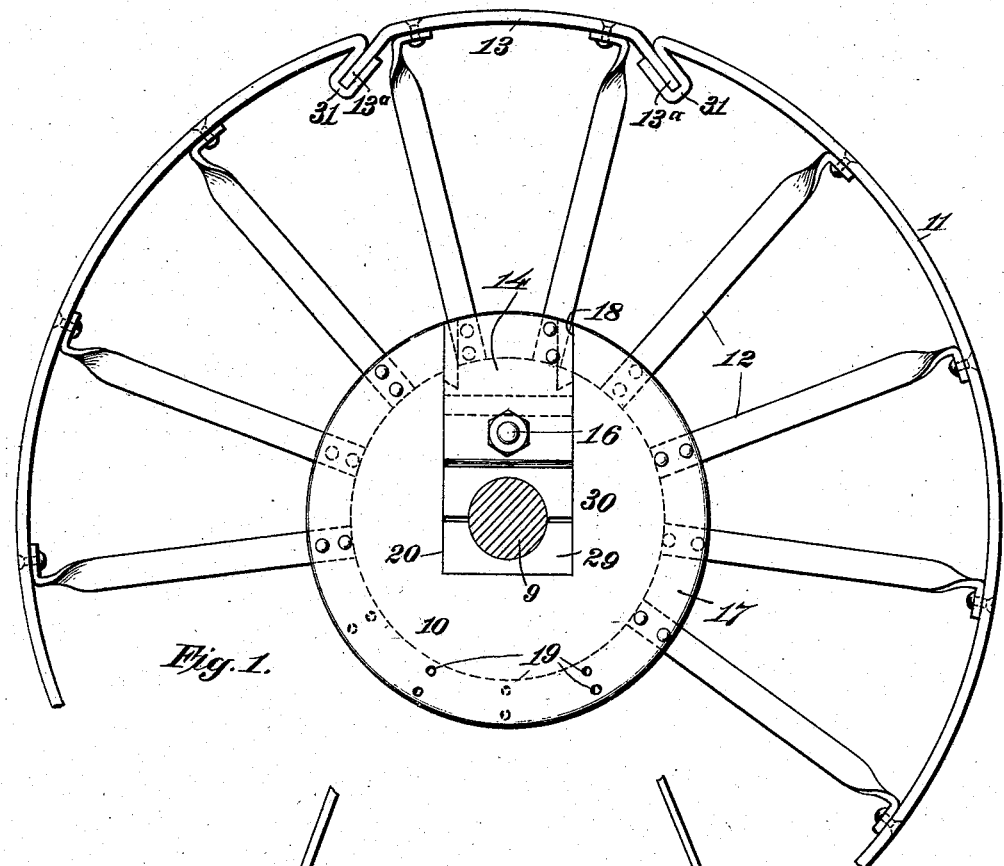
Figure 2:
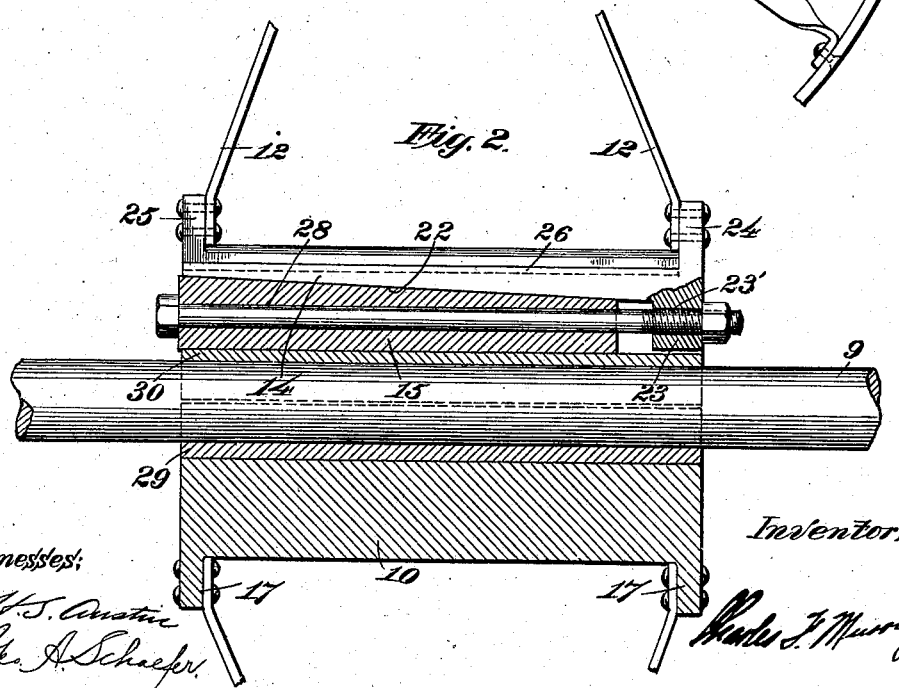

In the drawings, Figure 1 is a side elevation of a built-up pulley, as contemplated by my invention. Fig. 2 is a section thereof. Fig. 3 is a plan view of the hub thereof. Fig. 4 is an end view of the hub, a portion thereof being broken away. Fig. 5 is a perspective view of the removable wedge portion.

Referring to the drawings, 10 is the hub; 11, the rim; 12, the spokes; 13, the removable segment of the rim; 14, the removable block; 15, the wedge, and 16, the tightening bolt.

As will be seen, the central portion of the pulley is composed of a hub cylindrical in form, having concentric flanges 17, which are interrupted at 18 for the purpose hereinafter described. This hub is preferably cast in malleable iron, and provided with rivet holes 19. This hub 10 is provided with an oblong recess 20, extending downward from the opening 18. Upon the sides of this opening are outstanding lugs 21, the lower portions 21ª of which are formed diagonal to the line of the sides for a purpose hereinafter explained. Adapted to fit within this opening is the part 14, best shown in Fig. 5. The under surface 22 of the part 14 is formed at an angle to the shaft 9, and upon one end of the lower portion of the part 14 is a depending lug 23, having a bolt opening 23' therein. Upon the upper portion of the part 14, and at each end thereof, are upstanding flanges 24 25, having rivet holes 24' 25' therein for the attachment of the pulley spokes thereto. Upon the sides of the part 14 are diagonal grooves 26 for coöperation with the diagonal portions 21ª of the hub 10. The part 15 is in form a wedge, having its upper portion formed at an angle corresponding to the angle 22 of the part 14, and extended for coöperation therewith. Through its central portion, I provide a bolt opening 28 for the accommodation of the bolt 16. For coöperation with the shaft, I provide soft metal or wood bushings 29 30.

The rim 11 of my device is interrupted and bent backward upon itself at 31 to form a slot for the accommodation of the segment 13, the ends of which segment are bent downward as at 13ª in order to coöperate with said slots. The spokes 12 of my construction are adapted to be riveted upon the hub, and to be twisted until the end portions where they are attached to the rim are at right angles thereto. This twisting is for the purpose of securing a better bearing upon the rim.

The operation in assembling my pulley is as follows: The rivet holes in the hub 10 and block 14 may be cored in casting, or may be punched as desired. The rivet holes in the rim are punched and at the same time slightly countersunk to accommodate the heads of the rivets which are used to attach the spokes thereto. The spokes are riveted to the hub, then to the rim, the rim being first formed and the slots formed as at 31. The two spokes are then riveted to the block and the segment 13 of the rim. The remaining parts being at hand, the pulley is then ready for assembling upon the shaft. To accomplish this, the pulley with the block and segment removed, is placed upon the shaft, the bushings 29 30 are placed, and the block with its segment is forced inward as shown in Fig. 3. As will be seen in said Fig. 3, the shoulders 14ª upon the block 14 prevent the block from being pulled out of position by the action of the bolt in tightening the wedge therein. The wedge 15 and bolt 16 are then placed, the bolt passing through the opening 23' in the part 14. Upon tightening the nut upon the bolt 16, it will be seen that great wedging action is secured, and that the hub portion is bound securely upon the shaft. Means may be provided for locking the nut upon the bolt in order to provide against the same working loose.

It will be seen that the parts of my device are very few, that the parts are all of simple construction, and require no machining to make them operative. The surface 22 and the corresponding surface upon the wedge 15 need not be machined, as the wedging power of the bolt is so great that the locking action may be secured, even if the surfaces are slightly rough from casting.

It is my custom in manufacturing this device to provide a hub having an opening of standard size the same opening being used for pulleys of different diameters, the object of this being that the only change necessary to apply a pulley upon different sized shafts would be the change in the bushings. My custom is to furnish bushings with different sized openings for the shaft, in order that the pulley may be taken from one sized shaft and applied to another shaft with merely a change of the bushings. This will obviate the necessity of a user or dealer keeping in stock a large number of pulleys of the same diameter in order to furnish one which will fit a particular sized shaft. In my construction it will only be necessary to keep in stock bushings which will fit different sized shafts, the outside dimensions of the bushings always being the same.

Having thus described my invention, I claim as new and desire to secure by Letters Patent—

In a built-up pulley, a hub, rim and spokes, said rim having a removable segment in combination with a block provided with dove-tailed lugs and having its end portion shouldered and depending downward, and a wedge and bolt, said bolt being adapted to pass through said depending portion and said wedge, and adapted to lock the parts together, substantially as described.

CHARLES F. MURRAY.

Witnesses:
W. H. CAMERON,
GEO. A. SCHAEFER.